United States Patent [19]

Sturkey et al.

[11] Patent Number: 5,129,242
[45] Date of Patent: Jul. 14, 1992

[54] LOW-LIQUID JET MACHINE FOR WET PROCESSING TEXTILE FABRIC

[75] Inventors: William C. Sturkey, Charlotte; Charles R. Hornbuckle, Lincolnton, both of N.C.; Christoph W. Aurich, Clemson, S.C.; James K. Turner, Lincolnton; Paul L. Abernathy, Dallas, both of N.C.

[73] Assignee: Gaston County Dyeing Machine Co., Stanley, N.C.

[21] Appl. No.: 539,712

[22] Filed: Jun. 18, 1990

[51] Int. Cl.$^5$ ................................. D06B 3/28
[52] U.S. Cl. ....................... 68/178; 68/181 R
[58] Field of Search ................ 68/181 R, 177, 178

[56] References Cited

U.S. PATENT DOCUMENTS

| | | | |
|---|---|---|---|
| 971,778 | 10/1910 | Palmer | 68/178 |
| 1,665,624 | 4/1928 | Conrad | 68/178 X |
| 3,019,631 | 2/1962 | Freyberg | 68/178 |
| 3,066,006 | 11/1962 | Sonnino | 68/178 X |
| 3,921,420 | 11/1975 | Aurich et al. | 68/178 X |
| 3,949,575 | 4/1976 | Turner et al. | |
| 4,001,945 | 1/1977 | Aurich et al. | |
| 4,007,517 | 2/1977 | Turner et al. | |
| 4,114,407 | 9/1978 | Turner et al. | |
| 4,318,286 | 3/1982 | Sturkey | |
| 4,340,986 | 7/1982 | Sturkey | |
| 4,545,221 | 10/1985 | Daniel et al. | 68/177 X |
| 4,570,464 | 2/1986 | Thompson | 68/178 |
| 4,936,119 | 6/1990 | Thompson | 68/178 |

FOREIGN PATENT DOCUMENTS

| | | | |
|---|---|---|---|
| 2608527 | 9/1977 | Fed. Rep. of Germany | 68/177 |
| 2935114 | 3/1981 | Fed. Rep. of Germany | 68/177 |

*Primary Examiner*—Frankie L. Stinson
*Attorney, Agent, or Firm*—Shefte, Pinckney & Sawyer

[57] ABSTRACT

A wet processing jet machine for treating textile piece goods in rope form at a low liquid ratio. A plug supporting tube is provided as a vertical extension of a U-shaped processing chamber. The sides of the chamber are perforated and the bottom is imperforate for enhanced movement of the plug through the chamber. The tube extension is perforated to allow flow of liquid therefrom for enhanced plaiting. The amount of liquid with the rope in the plug is minimized for low liquid requirements and the head of the plug causes the plug to progress through the chamber above the low level of the liquid in the bottom of the vessel, which liquid level is below the bottom of the chamber or at least at a level that does not cause substantial floatation of the plug. The rope entering the tube is plaited by passing through an inverted frusto-conical plaiting nozzle that is oscillated and reciprocated to provide effective plaiting. In addition, a steam jet nozzle is provided for treatment and also to provide a driving impetus to the rope as it travels through the machine. The nozzle is formed with an annular housing having a wide steam accumulation chamber connected to a narrow supply passage leading upstream to a wide distribution chamber from which the steam flows downstream through a delivery passage to an annular orifice opening at a downstream inclination into the interior housing through which the rope travels.

36 Claims, 11 Drawing Sheets

LOW-LIQUID JET MACHINE FOR WET PROCESSING TEXTILE FABRIC

BACKGROUND OF THE INVENTION

The present invention relates to a machine for wet processing textiles and more particularly to a low-liquid jet machine for wet processing textile fabric in continuous rope form.

Jet dyeing machines have long been used in the textile industry for piece dyeing of textile fabrics in cloth rope form. In machines of this type, the cloth is laid upon itself in folds to form a plug that progresses through a dyeing chamber containing the treating liquid. The cloth is then drawn off the leading end of the plug by the force of a liquid jet acting on the rope downstream of the plug and usually assisted by a lifter reel. The jet discharges circulating treating liquid against the cloth rope and drives it to form into folds on the trailing end of the cloth rope plug. The weight of the cloth rope being added to the trailing end of the plug in combination with the weight being removed from the leading end of the plug by withdrawing of the cloth rope therefrom by the jet causes the plug to advance slowly through the treating chamber. Usually, the treating chamber contains treating liquid to a level sufficient to substantially submerge the plug, which also provides buoyancy to facilitate advance of the plug. However, it has long been sought to reduce the amount of treating liquid used in proportion to the amount of cloth being treated, i.e., the liquid to cloth ratio. A low-liquid ratio is desirable from an expense standpoint in that less treating material is necessary and less energy is necessary for heating and circulating the liquid. Of increasing importance is the advantage with low-liquid ratios of reducing the effluent that must be treated and disposed of at the end of each processing cycle.

Various attempts have been made to design jet dyeing machines that are capable of operating at low-liquid ratios with some success. For example, gas jets have been used to reduce the amount of treating liquid being circulated, which may be introduced into the circulating air to form a foam or may be atomized into the gas. Examples of such prior art are disclosed in U.S. Pat. Nos. 3,921,420; 3,949,575; 4,007,517; and 4,483,032. In all of the known prior art, however, a sufficient amount of treating liquid is required to provide at least partial submergence of the cloth rope plug for sufficient buoyancy to facilitate advance of the plug.

In all of the prior low-liquid ratio machines, there is a problem of maintaining proper circulation of the plug with minimal energy without significant reduction in capacity. A plug that is not at least partially floating in liquid will not advance as freely as a submerged plug and normally must be of smaller volume, which results in the machine having less capacity.

By the present invention, a low-liquid jet machine is provided having unique features that provide the capability of operating efficiently at high capacity with an enhanced plug formation and progression with a low-liquid ratio and with improved cloth rope circulation.

SUMMARY OF THE INVENTION

Briefly described, the present invention provides a low-liquid jet machine for wet processing textile fabric in continuous cloth rope form including a vessel for containing liquid in the bottom thereof and a U-shaped chamber mounted in the vessel and disposed for circulation of the cloth rope therethrough in plug form. Liquid jet means circulates the cloth rope by withdrawing it from the leading end of the plug at a cloth rope discharge end of the U-shaped chamber and circulates it to the trailing end of the cloth plug at a cloth rope receiving end of the U-shaped chamber. Means are provided for circulating the liquid from the bottom of the vessel to the jet means while maintaining a low level of liquid in the bottom of the vessel generally below a level at which the liquid would cause substantial floatation at the cloth plug. The U-shaped chamber has perforated side walls to permit liquid to flow therethrough from the cloth plug to the circulating means and has an imperforate bottom wall for free advance of the cloth plug therealong. A plug supporting tube extends generally vertically from and as an extension of the cloth rope receiving end of the U-shaped chamber to a height substantially above the height of the leading end of the cloth plug. Means are included for feeding the cloth rope from the fluid jet means into the plug supporting tube to form the cloth rope in plug form in the tube. The tube is perforated in the general location of plug formation to permit liquid to flow from the cloth rope to facilitate enhanced uniform plug formation across substantially the full lateral extent of the tube. Further the tube extends vertically sufficiently for forming a trailing plug head above the height of the leading end of the plug of sufficient height to cause the plug to advance through the U-shaped chamber as the cloth rope is withdrawn from the leading end of the plug and fed to the trailing end of the plug.

With this arrangement, the cloth rope circulates through the machine including progressing through the plug formation without requiring significant submersion in the liquid within the vessel so that a very low liquid ratio can be utilized at substantial advantage.

Preferably, the plug supporting tube is formed with its perforations extending around the circumference of the tube throughout a substantial lengthwise extent of the tube for draining the liquid from the cloth plug as it advances in the tube and cause lateral flow of liquid in the tube to the perforations to facilitate enhanced uniform plug formation across the full lateral extent of the tube.

The U-shaped chamber may be spaced from the bottom of the vessel to permit flow of liquid therebetween and the chamber bottom may be above the level of the liquid in the vessel. Alternatively, the bottom of the vessel may form the bottom of the U-shaped chamber.

A liquid discharge trough is preferably mounted in the vessel and connected to the exterior of the tube adjacent the U-shaped chamber for collecting liquid discharge through the perforations. The trough extends away from the U-shaped chamber and has an outer discharge end for discharging liquid into the bottom of the vessel. Preferably, the tube has an imperforate extent at and extending upwardly from the trough sufficient to prevent liquid in the trough from re-entering the tube.

A housing encloses the tube at a spacing therefrom for confining therebetween the flow of liquid that has flowed through the perforations. This housing has an open lower end for discharge of liquid to the bottom of the vessel. Preferably, the open end of the housing terminates above the lower extent of the tube and the aforementioned trough is mounted in the vessel and connected to the tube below the open end of the housing for collecting liquid flowing from between the housing and the tube.

Preferably, the vessel is cylindrical and the plug supporting tube extends exteriorly above the vessel from the U-shaped chamber within the vessel for forming the cloth rope plug at a height above the vessel, with the tube-enclosing housing extending above the vessel for enclosure of the tube.

In the preferred embodiment, the U-shaped chamber, liquid jet means, liquid circulating means, plug supporting tube and cloth feeding means comprise a cloth rope processing unit and there are a plurality of units within the vessel. In this arrangement, the aforementioned trough extends along all of the units for common discharge of liquid draining from the tubes of the plurality of units.

To facilitate unentangled withdrawing of the cloth rope from the plug, the cloth rope discharge end of the U-shaped chamber preferably flares transversely outwardly at the location of the leading end of the cloth plug. Also, to facilitate movement of the plug, a coating of low friction material is provided on at least a portion of the interior surface of the chamber, and to facilitate smooth free advance of the cloth plug through the tube the perforations are rounded outwardly from the inner surface of the tube.

Preferably, the cloth feeding means includes a plaiting nozzle at the upper end of the tube and through which the cloth rope and liquid from the jet means are fed into the tube, and means are provided for manipulating the nozzle transversely of the tube for plaiting the cloth rope into plug form. For enhanced processing interaction, the plaiting nozzle may be narrowed in the direction of cloth and liquid flow. The size of the nozzle may be varied by use of a liner removably insertable in the nozzle to reduce the size thereof.

The cloth feeding means includes means for reciprocating and oscillating the plaiting nozzle, which comprises a shaft extending transversely with respect to the tube and on which the plaiting nozzle is mounted. The shaft is manipulated by means for reciprocating and oscillating the shaft that includes reciprocating drive means, bearing means reciprocated by reciprocating drive means and connected to said shaft for reciprocation of the shaft, with the shaft being oscillatable with respect to the bearings and the oscillating drive means being connected to the shaft for oscillation thereof.

In an arrangement where there are a plurality of cloth rope processing units, the shaft extends through all of the units for common mounting of the nozzles at each unit and common reciprocation and oscillation of the nozzles.

The above described plaiting means has special advantage in combination with the extending tube feature of the present invention, but it also has advantage in facilitating plug formation in other arrangements as well.

Circulation of the cloth rope and low-liquid wet processing are facilitated in the present invention by the further feature of steam jet means for applying a jet of steam to the traveling cloth rope. This steam jet means includes a housing having a hollow cylindrical interior through which the cloth rope travels, and a supply conduit communicating with the housing for supplying steam under pressure thereto. The housing has a relatively narrow annular supply passage for receiving steam from the conduit and extends therefrom in the upstream direction with respect to cloth rope travel. The housing further includes a relatively wide annular steam distribution chamber at the end of the steam supply passage upstream with respect to cloth rope travel for receiving steam from the supply passage and distributing the steam generally uniformly in the distribution chamber. In addition, the housing has an annular steam delivery passage substantially narrower than the distribution chamber and communicating with and extending from the distribution chamber in the downstream direction of cloth rope travel. The steam delivery passage terminates downstream in an annular steam jet orifice opening into the hollow interior of the housing at an inward inclination in the downstream direction of the cloth rope travel for discharging steam therethrough to apply a driving force to the traveling rope. Preferably, the housing has a relatively wide steam accumulation chamber communicating with the conduit and with the end of the supply passage downstream in the direction of cloth rope travel for accumulating steam being supplied therethrough from the conduit to the supply passage. The annular supply passage is preferably disposed overlappingly outward of the delivery passage and the housing includes an annular intermediate section extending annularly between and separating the supply passage and the delivery passage. This intermediate section terminates at the distribution chamber.

In the preferred embodiment, the housing is formed of two axially aligned components having inner cylindrical surfaces forming the inner cylindrical surface of the housing. These housing components are spaced apart to form the steam jet orifice therebetween and are relatively adjustable axially to adjust the size of the steam jet orifice. With this arrangement, the annular intermediate section is connected to and extends from the component that is downstream in the direction of cloth rope travel and extends over the other of the components to define the steam delivery chamber therebetween.

This steam jet means provides enhanced results when combined with the other features described above, but also has application to other types of cloth rope treatment arrangements as well.

Other and further features of the present invention will be apparent from the accompanying drawings and following detailed description of the preferred embodiment.

DETAILED DESCRIPTION OF THE PREFERRED EMBODIMENT

Figure 1:
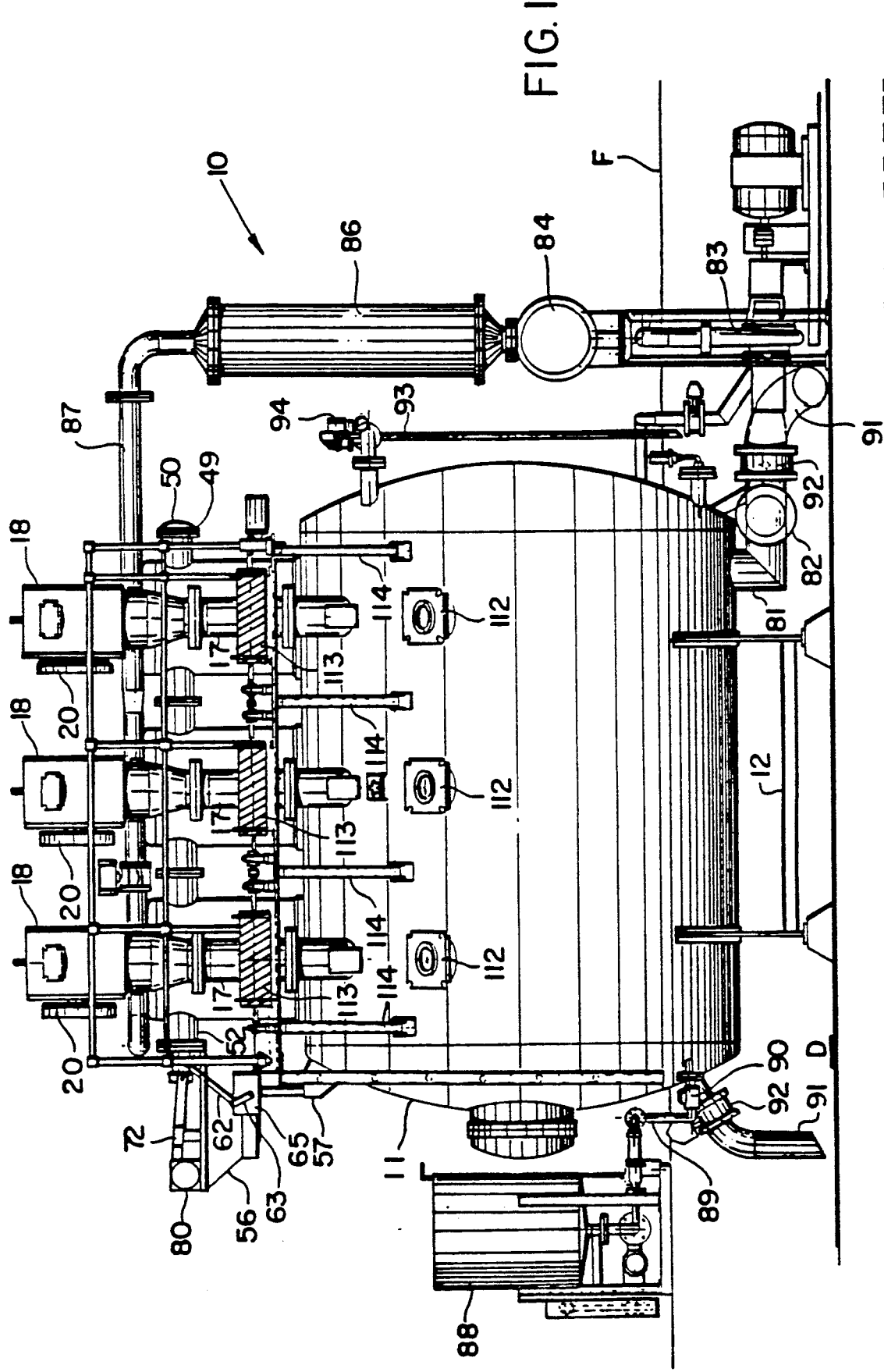
FIG. 1 is a front elevational view of a low-liquid jet machine for wet processing textile fabric in continuous cloth rope form according to the preferred embodiment of the present invention.
Figure 2:
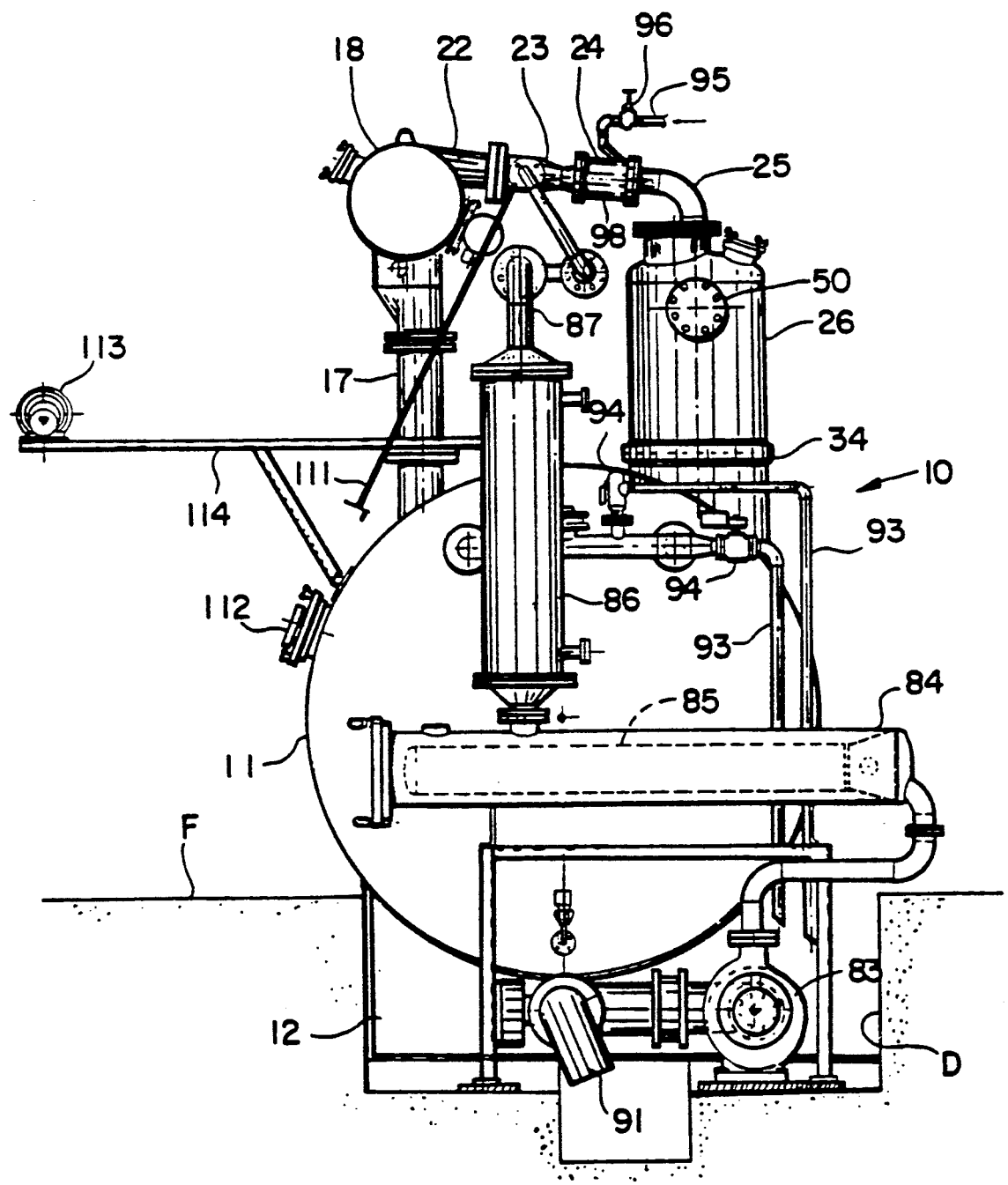
FIG. 2 is an end elevational view of the right end of the machine as viewed in FIG. 1.
Figure 3:
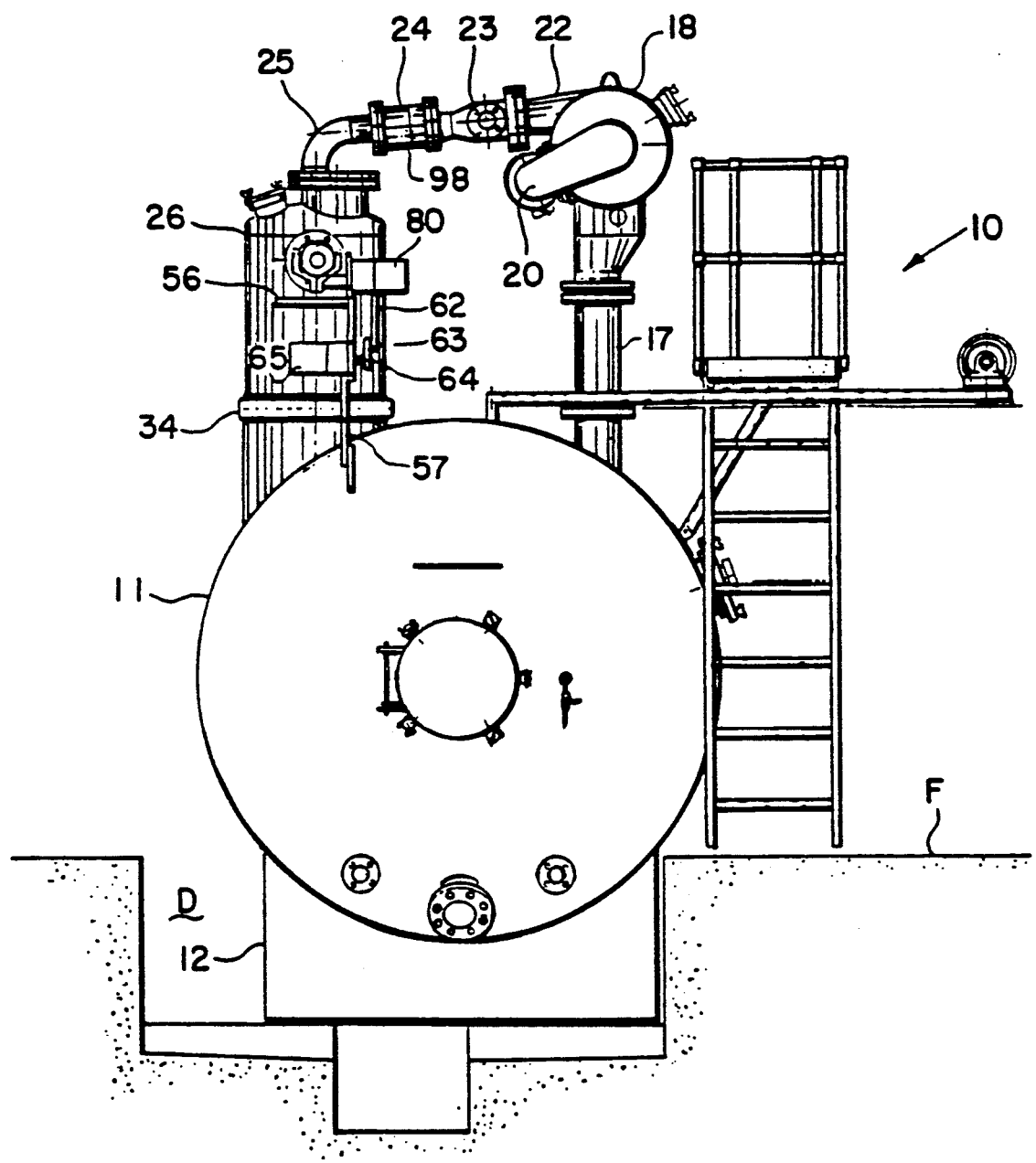
FIG. 3 is an end elevational view of the left end of the machine as viewed in FIG. 1.

With reference to the accompanying drawings, the machine 10 of the preferred embodiment of the present invention is a low-liquid jet machine for wet processing textile fabric in continuous cloth rope form. The machine 10 includes a closed pressure vessel 11 of cylindrical form disposed with a generally horizontally extending axis of generally conventional form mounted on a base 12 in a drain pit D in the floor F of the facility in which the machine 10 is operating. This machine 10 is illustrated as being a three port type having three treating sections or units 13 sequentially arranged along the axis of the machine. In each unit 13 an endless cloth rope R of pieces goods is circulated and subjected to wet processing by a liquid L that is circulated through the machine 10.

It should be understood that the present invention is not limited to any particular number of treating units 13 as the invention would be applicable to single unit machines as well as to machines of any number of units.

Figure 4:
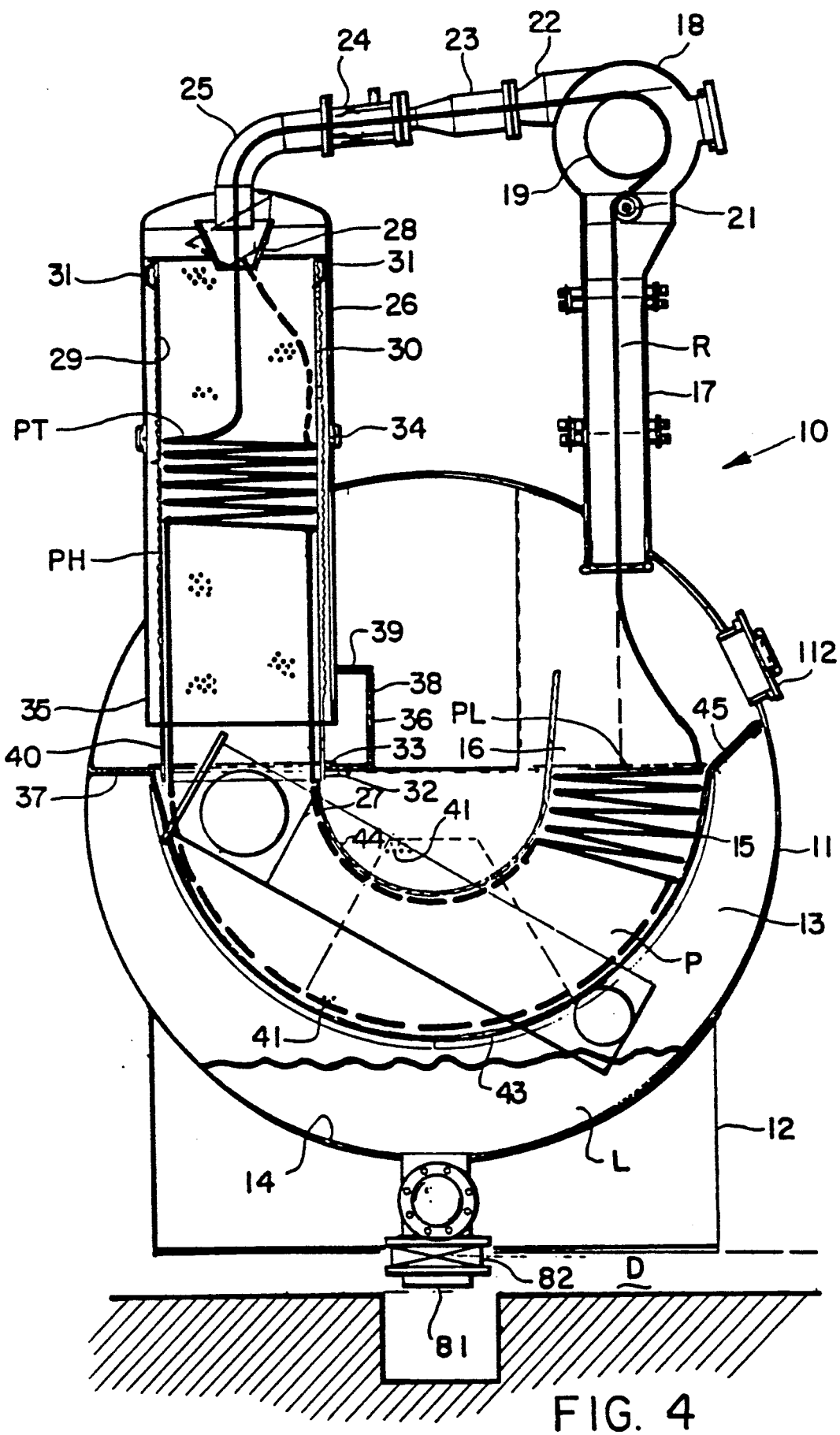
FIG. 4 is a transverse vertical sectional view of the machine of FIG. 1, illustrating the components located interiorly of the machine.

As illustrated in FIG. 4, the cloth rope R is circulated through the vessel 11 in the form of a folded plug P progressing through a U-shaped chamber 15. The cloth rope R is withdrawn from the plug P at the leading end PL, illustrated at the right in FIG. 4, which is at the cloth rope discharge end 16 of the U-shaped chamber 15. The cloth rope R is withdrawn upwardly through a vertical tube 17 vertically aligned with the discharge end 16 of the chamber 15 and extending vertically from within the vessel 11 upwardly exteriorly of the vessel 11 to a lifter reel housing 18 in which a conventional lifter reel 19 is mounted for rotation about a horizontal axis to pull the cloth rope R upwardly from the plug P. The lifter reel 19 is driven by a conventional drive mechanism 20 and the frictional purchase of the lifter reel 19 on the rope R is enhanced by an idler roll 21 mounted at the upper end of the vertical tube 17 for training of the rope R therearound to the lifter reel 19 for enhanced surface contact of the rope R on the lifter reel 19 to facilitate rope drive.

From the lifter rail 19 the rope R travels through a horizontal tubular section that is slightly downwardly inclined and includes liquid jet means in the form of a conventional liquid jet nozzle 23 through which the cloth rope passes and through which the liquid L is directed in a downstream direction onto the cloth rope R to apply the liquid L to the rope R for processing application thereto and also to provide a driving force to the cloth rope R. The horizontal tubular section 22 also includes steam jet means for applying a jet of steam to the traveling cloth rope R to facilitate circulation and wet processing. In the embodiment illustrated, the steam jet means is in the form of a steam jet nozzle 24 in advance of the liquid jet nozzle 23 and through which the rope R travels in advancing through the horizontal tubular section 22. The application of steam through the steam jet nozzle 24 is optional. Preferably, it is used to add to the driving imparted by liquid through the liquid jet nozzle 23 so that less liquid needs to be circulated, thereby reducing the amount of liquid necessary for operation and allowing an efficient and economical low-liquid processing to take place. Also, the application of a steam jet may be used during rinsing or scouring where no liquid needs to be circulated through the liquid jet nozzle 24. Alternatively, the machine 10 can be operated without applying steam, in which case the cloth rope R passes unaffected through the steam jet nozzle 24.

The steam, liquid and rope R are discharged through an elbow 25 in the horizontal tubular section 22, which elbow 25 opens vertically downwardly into a vertically extending housing 26 that extends from above the vessel 11 downwardly into the vessel 11 in alignment with the cloth rope receiving end 27 of the U-shaped chamber 15. As the cloth rope R and liquid discharge from the elbow 25 of the horizontal tubular section 22 into the housing 26, they flow into a plaiting nozzle 28 located directly below the elbow 25 in alignment therewith. As will be described later, this plaiting nozzle 28 oscillates about a horizontal axis and reciprocates along that horizontal axis to discharge the rope R in a universal plaiting action into a plug supporting tube 29 wherein the rope R is folded by the plaiting action to form the trailing end PT of the plug P.

The plug supporting tube 29 extends generally vertically within the housing 26 as an extension of the cloth rope receiving end 27 of the U-shaped chamber 15, with the height of the plug supporting tube 29 being substantially above the height of the leading end PL of the cloth plug P. This height is sufficient for forming a trailing plug head PH above the height of the leading end of the plug PL of sufficient weight to cause the plug P to advance through the U-shaped chamber 15 as the cloth rope R is withdrawn from the leading end PL of the plug and circulated for feeding to the trailing end PT of the plug P.

With this arrangement of a plug supporting tube 29 extending upwardly through and above the vessel 11, it is possible to provide a sufficient plug head to maintain plug circulation with a large quantity of rope R relative to the size of the vessel 11 and to allow operation at a significantly low liquid ratio. In this regard, contrary to conventional piece dyeing jet machines, the machine 10 of the present invention is capable of operating without requiring at least partial submersion of the plug P in the liquid L in the bottom of the vessel 14 to support and facilitate progression of the plug P through the U-shaped chamber 15. Rather, with the present invention, the level of the liquid L in the bottom 14 of the vessel 11 is below the bottom of the U-shaped chamber 15 so that the plug P is well above the level of the liquid L.

The draining of liquid from the plug P to enhance the low-liquid ratio capabilities of the machine 10 is enhanced by forming the surface of the plug supporting tube with perforations 30 through substantially its entire length except near the lower end thereof. These perforations 30 are closely spaced throughout the surface and are each rounded outwardly to provide a smooth surface for free advance of the plug without any damaging contact or abrasion of the rope R as it advances past the perforations 30. With this arrangement, as the liquid L and rope R are discharged from the plaiting nozzle 28 into the plug supporting tube 29, the liquid passes freely through the perforations 30 and this flow of the liquid L not only drains the liquid from the cloth rope R and plug P as it is formed to minimize the amount of liquid needed in the machine for continuous circulation, but also facilitates plug formation with minimum tangling and snarling as the flow of liquid L peripherally through the perforations 30 helps proper plaiting toward the wall of the plug supporting tube 29 and without significant floating of the rope R as it is being folded into the plug P.

To provide for flow of the liquid L draining through the perforations 30 of the plug supporting tube 29, the tube 29 is mounted within the vertical housing 26 at a peripheral spacing sufficient to allow the liquid L to flow downwardly within the housing outside of the tube 29. This spacing is maintained uniformly by spacing flanges 31 adjacent the top of the tube 29 and projecting outwardly into contact with the housing 26. At its lower end 32, the tube 29 is formed with an outwardly projecting annular flange in covering relation over the receiving end 27 of the U-shaped chamber 15, thereby positioning the tube 29 with respect to the chamber 15 and also preventing flow of liquid L from the outside of the tube 29 into the chamber 15.

To permit removal and replacement of the tube 29 as required for inspection, or cleaning or replacement, the housing 26 is formed in two vertically arranged sections as indicated by the joint 34 so that the upper section can be removed to allow removal of the tube 32. The lower section of the housing 26 extends to a lower end 35 that is spaced above the U-shaped chamber 15 to permit liquid to flow from between the housing 26 and tube 29 for reentry into the vessel 11. The liquid flowing from the lower end 35 of the housing 26 flows into a trough 36 that extends horizontally and longitudinally through the vessel 11. This trough 36 has a bottom plate 37 that extends at a spacing from one end of the vessel 11 to a spacing from the other end of the vessel 11 along all of the lower ends 32 of the tubes 29 at a spacing below the lower ends 35 of the housing 26 of the treating units 13.

The trough 36 is further formed with an upstanding longitudinal wall 38 disposed inwardly of the vessel 11 from the housings 26 and extending upwardly from the bottom plate 37 to a location above the lower ends 35 of the housing 26. The trough 36 is further formed with a horizontal top plate 39 extending from the top of the upstanding wall 38 into contact with the housing 26. The upstanding wall 38 and top plate 39 combine to confine the flow of liquid that enters the trough 36 from between the tube 29 and housing 26 for flow to the ends of the trough 36 from which the liquid flows downwardly into the bottom of the vessel 11 for recirculation. In this manner, the liquid is directed away from the U-shaped chambers 15 to prevent significant entry of liquid into the chambers 15. For the same purpose, the lower portion 40 of each plug supporting tube 29 is imperforate from the lower end 32 to a location vertically within the housing 26 so that flowing liquid will not be permitted to enter the tubes 29 in the location of the trough 36.

With this arrangement, there is sufficient liquid in the cloth plug P itself for interaction of the liquid and plug for processing as the plug P advances through the chamber 15, but the draining of liquid eliminates excess liquid for low-liquid processing and results in a relatively heavy, compact plug head PH that provides sufficient weight to force the plug to progress down into and through the U-shaped chamber 15. The removal of liquid is further facilitated by perforations 41 formed in the side walls 42 of the chamber 15. The bottom wall 43 and top wall 44 of the chamber 15 are imperforate, and all of the walls 42,43,44 are coated with a low coefficient of friction material, such as Teflon or other comparable coating material, which facilitates progression of the plug P through the chamber 15 without substantial frictional resistance.

As seen in FIG. 4, the rope R is plaited to form the plug head PH near the top of the tube 29, which is well above the vessel 11. The rope R is then withdrawn from the plug P within the vessel 11 at the discharge end 16 of the chamber 50, which discharge end 16 flares outwardly as illustrated at 45 to allow the plug P to expand and the rope R to be freely pulled from the plug without significant resistance or tangling.

Figure 5:
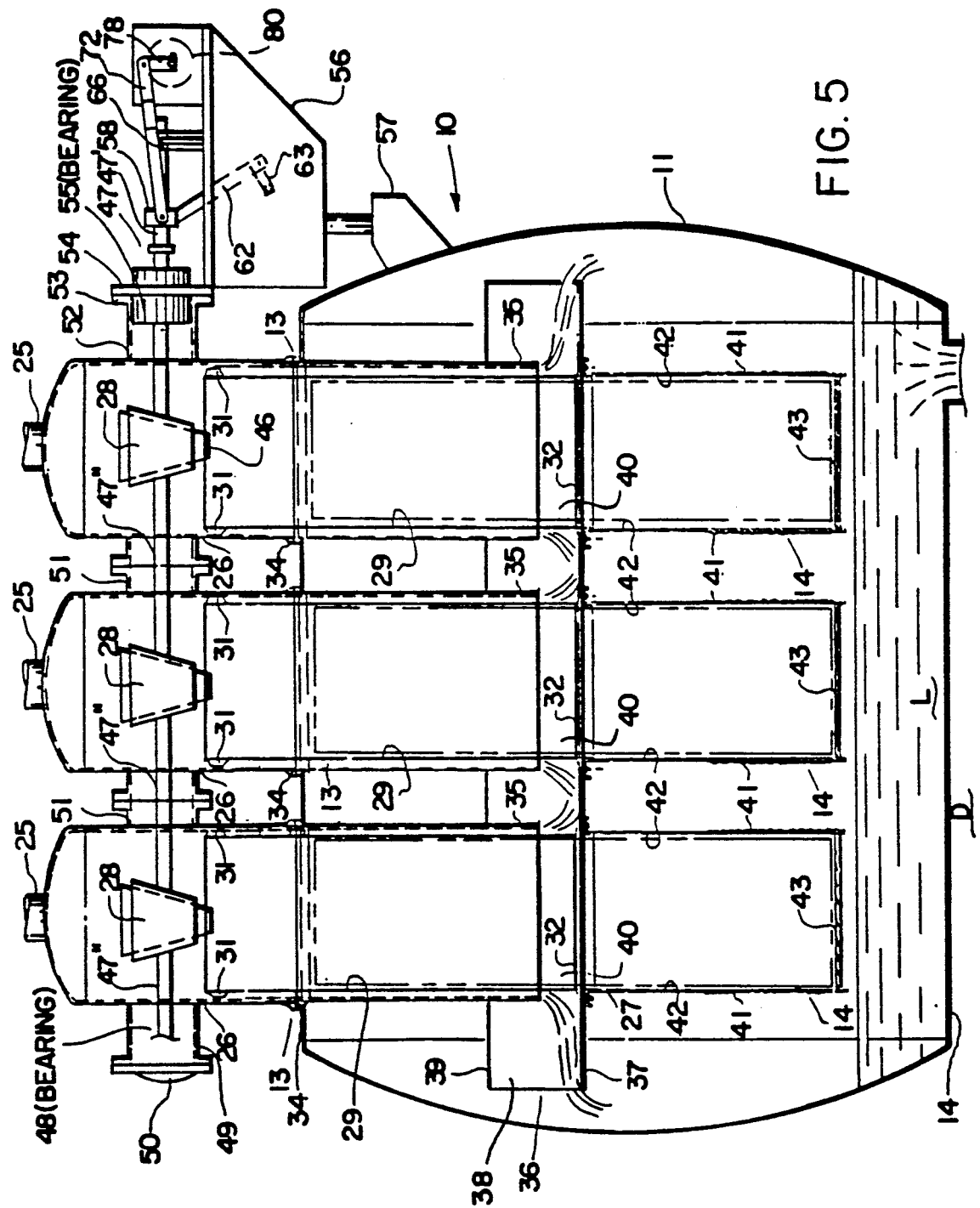
FIG. 5 is a longitudinal vertical sectional view of the machine of FIG. 1, illustrating the components interiorly of the machine and illustrating the mechanism for reciprocating and oscillating the nozzles for plaiting the cloth ropes being circulated through the machine.
Figure 6:
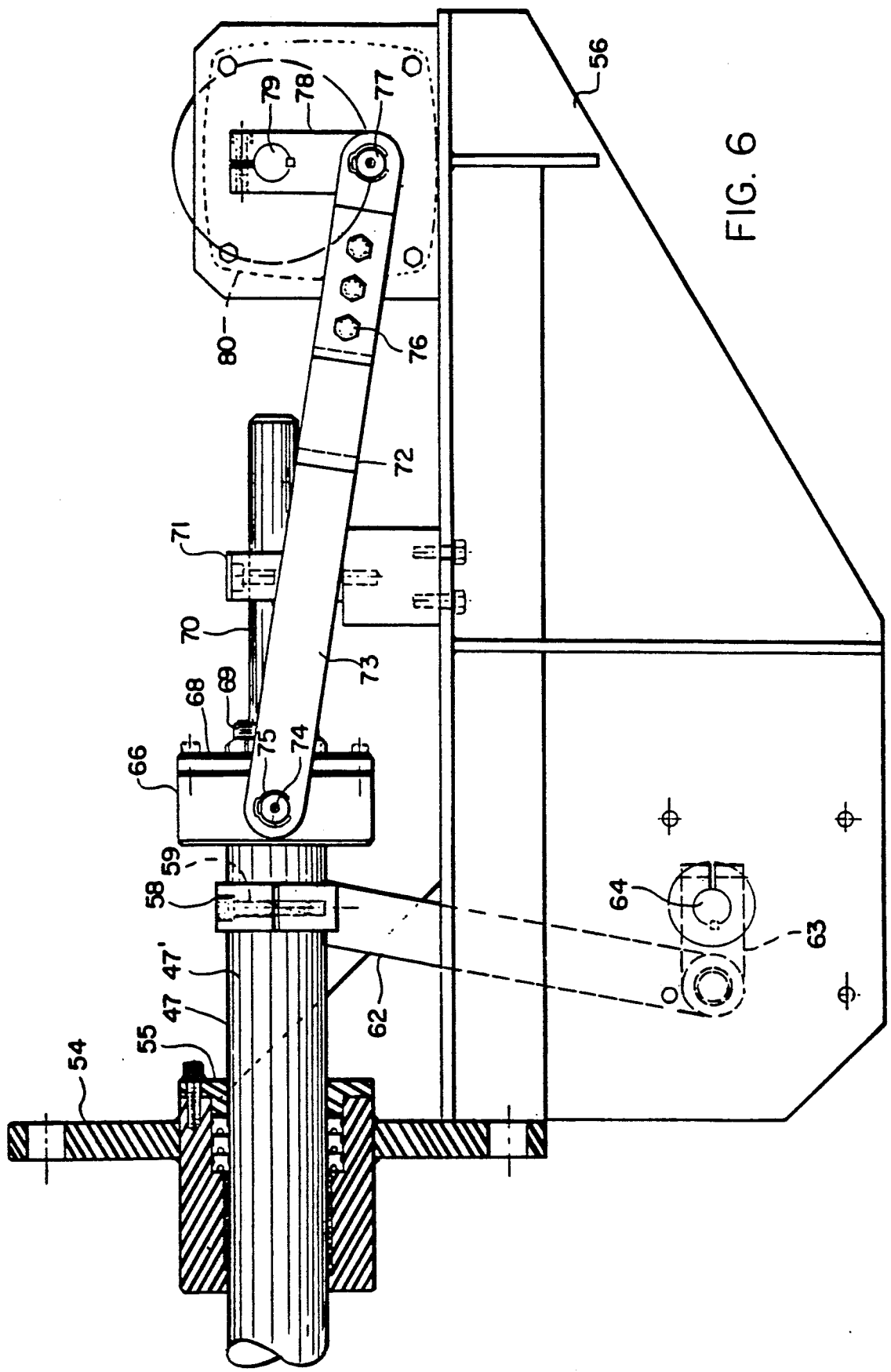
FIG. 6 is an enlarged elevational view of the mechanism for oscillating and reciprocating the plaiting nozzles illustrated in FIG. 5.
Figure 7:
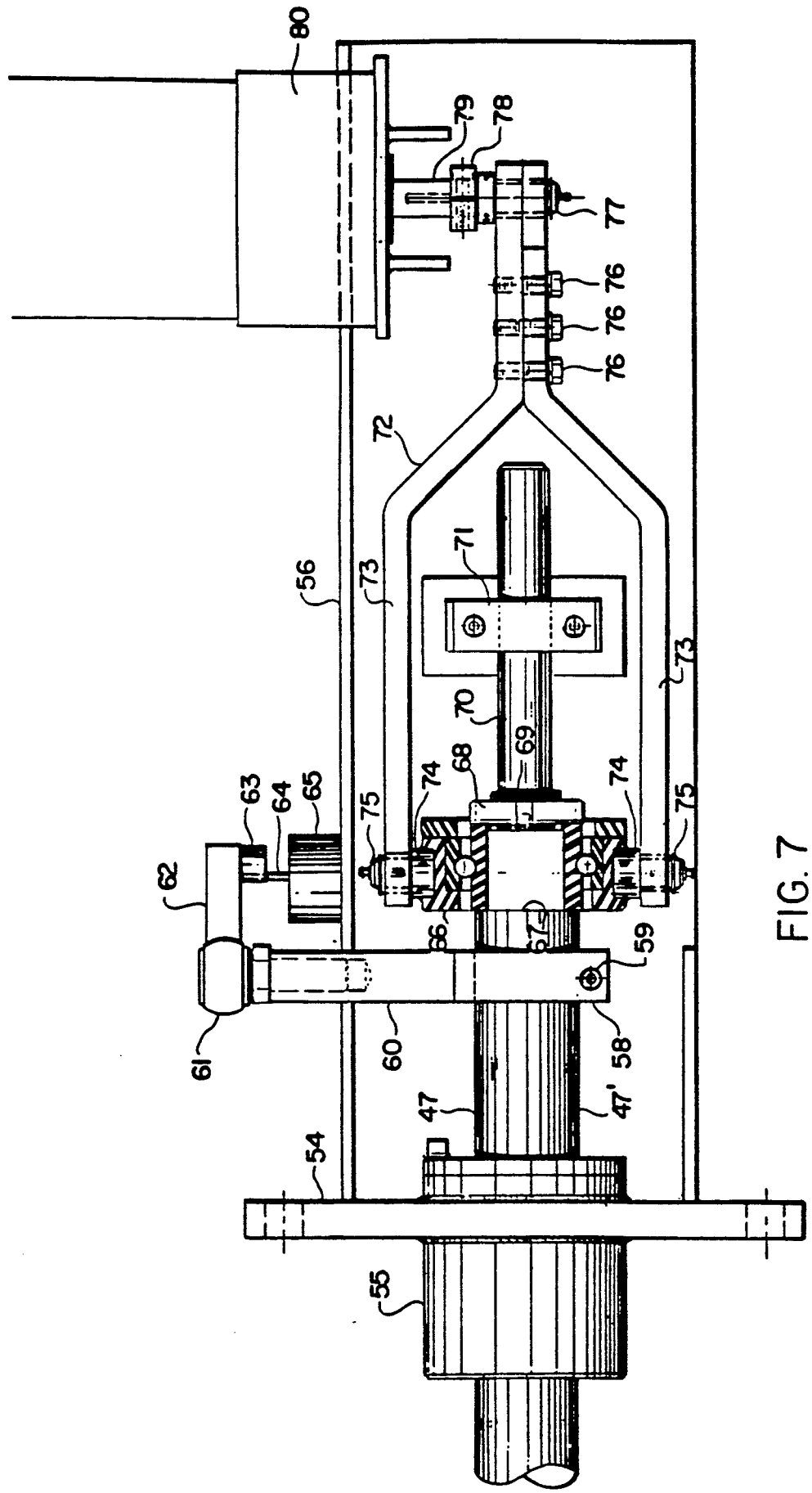
FIG. 7 is a plan view, partially in section, of the mechanism of FIG. 6.

Referring to FIGS. 5,6 and 7, the plaiting nozzles 28 and the means for oscillating and reciprocating the plaiting nozzles are illustrated in detail. Each nozzle 28 is in the form of a hollow inverted frusto-conical nozzle generally centered with respect to the plug supporting tubes 29 for reciprocation and oscillation in discharging the ropes R into the tubes 29 to form the plugs P. With the inverted frusto-conical shape, the nozzles 28 narrow downwardly to confine the cloth rope R and liquid L as they are guided into the tubes 29. These nozzles 28 provide somewhat of a jetting action of the liquid onto the ropes R as the nozzles 28 oscillate and reciprocate, thereby facilitating the processing interaction of the liquid and cloth ropes R.

As illustrated by example in the right-hand treating unit of FIG. 5, a liner 46 may be placed in a nozzle 28 to reduce the opening at the bottom or to provide a different surface. The inverted frusto-conical shape of the nozzles 28 and liners 46 permit easy insertion and positioning and easy removal of the liners 46.

The means for reciprocating and oscillating the plaiting nozzles 28 includes a horizontally extending shaft 47 having a driven section 47' at one end (the left end as viewed in FIGS. 5,6 and 7), which is connected to the plaiting nozzle 28 in the adjacent treating unit 13, intermediate sections 47' connected between plaiting nozzles 28 of adjacent treating units 13, and an end section 47''' connected to and extending from the plaiting nozzle 28 of the treating unit 13 fartherest from the driven section 47' (the treating unit 13 at the fartherest left in FIG. 5). Thus, the shaft 47 and its sections 47',47'' and 47''' provide the driving connection for the plaiting nozzles 28 in all of the treating units 13. The end section 47''' of the shaft 47 is supported in a bearing 48 mounted in a horizontally extending tubular portion 49 projecting outwardly from the housing 26 of the fartherest left (as viewed in FIG. 5) treating unit 13, which is sealed with an end cap 50. The housings 26 have similar horizontal tubular portions 51 projecting between treating units 13 and connected together to provide a continuous housing for the intermediate shaft sections 47''. In the same manner, the housing 26 of the fartherest right (as viewed in FIG. 5) treating unit 13 has a horizontal tubular portion 52 projecting outwardly to provide a housing extension for extension therethrough of the driven shaft section 47'. This tubular portion 52 has an annular flange 53 at its outer end to which is mounted a flange 54 in which a bearing 55 is mounted for sliding and rotating support of the driven shaft section 47'.

Secured to and extending outwardly from the flange 54 for the shaft bearing 55 is a platform 56 that is also supported by a supporting structure 57 secured to and upstanding from the end of the vessel 11.

The platform 56 supports means for rotating the shaft 47 and means for reciprocating the shaft 47. The means for oscillating the shaft 47 includes an annular collar 58 clamped by a bolt 59 on the driven shaft section 47' for movement therewith without relative oscillating or reciprocal motion. As seen in FIG. 7, the collar 58 has an arm 60 projecting radially therefrom and having a universal ball joint 61 mounted at the end thereof. The arm 60 projects from the collar 58 in a horizontal direction when the shaft is in a position in which the axes of the frusto-conical plaiting nozzles are vertical. Connected to the ball joint 61 is a connecting link 62 extending downwardly and connected to the outer end of a crank arm 63 that is rotated in a vertical plane by a rotating horizontal drive shaft 64 driven by a motor 65 mounted on the platform 56 below the shaft 47. The crank arm 63 is relatively short so that as it is rotated by the drive shaft 64 it will cause the connecting length 62 to reciprocate in a generally vertical direction causing oscillation of the shaft 47 through the ball joint 61 and collar 58 connection, with the ball joint 61 maintaining the oscillation of the shaft 47 and connected plaiting nozzles 28 while accommodating reciprocal movement caused by the means for reciprocating the drive shaft 47.

The means for reciprocating the shaft 47 include a ball bearing 66 mounted on a reduced diameter shoulder 67 projecting outwardly from the driven shaft section 47' and secured thereto against relative reciprocation by a collar 68 threaded on threads 69 on the outer end of the shoulder 67. The driven shaft section 47' has an end portion 70 extending outwardly from the shoulder 67 of reduced diameter for assembly of the ball bearing 66 thereover. This end portion 70 is mounted for reciprocation and oscillation in a bearing 71 that is mounted on the platform 56. A forked connecting lever 72 has parallel spaced arms 73 pivotally connected on stub shafts 74 secured to and projecting radially oppositely from the bearing 71 and retained thereon by retaining rings 75. The parallel arms 73 extend generally horizontally outwardly from the bearing 71 and converge outwardly of the shaft end portion 70. The arms 73 converge and are secured together by bolts 76, with the end of the connecting lever 72 mounted on a stub shaft 77 projecting from a crank arm 78 that is rotated in a vertical plane by a horizontal drive shaft 79 projecting from an electric drive motor 80 that is mounted on the platform 56. In this manner, rotation of the drive shaft 79 causes rotation of the crank arm 78 which, in turn, causes reciprocation of the connecting lever 72 and, through the bearing 71, reciprocation of the shaft 47 and connecting plaiting nozzle 28. The bearing 71 permits oscillation of the shaft 47 and plaiting nozzles 28 while the shaft 27 is being reciprocated by the shaft reciprocating means.

The pattern of reciprocation and oscillation may be programed as desired to obtain suitable results. In one use, the reciprocation operation is programed at the rate of about 9 to 10 strokes per minute and the oscillation is at a rate double the rate of reciprocation.

The processing liquid is circulated through the machine 10 in a conventional manner. At one end of the vessel 11 (the right end in FIG. 1) a discharge pipe 81 is connected to the bottom of the vessel 11 and leads through a shut-off valve 82 to a centrifugal pump 83 that pumps liquid from the bottom of the vessel 11 through the discharge pipe 81 into a plenum 84 in which a cylinder 85 is located to occupy space in the plenum 84 to reduce the amount of liquid contained therein. From the plenum 84, the pumped liquid is circulated through a heat exchanger 86 from which it flows through a delivery pipe 87 and conventional throttle valves (not shown) to the liquid jet nozzles 23 for introduction into the horizontal tubular sections 22 and thus through the plaiting nozzles 28 and into the plug supporting tubes 29, from which the liquid flows through the perforations 30 into the trough 36 and back into the bottom of the vessel 11, with some of the fluid being entrapped with the cloth rope R and the plug P as the rope R progresses through the U-shaped chamber, some of the liquid in the plug P passing through the perforations 41 of the U-shaped chamber.

Treating compositions, such as dyes and other chemicals are placed in a conventional mixing tank 88, from which they are delivered through an add line 89 and control valve 90 to the liquid in the bottom of the vessel 11.

Upon completion of an operating cycle, the liquid in the vessel 11 can be drained through drainpipes 91 at each end of the vessel, with shut-off valves 92 in the drainpipes 91 normally being closed to prevent draining.

Pressure within the vessel 11 can be released through piping 93 connected to the upper portion of the end of the vessel 11 with appropriate operating valves 94.

Figure 8:
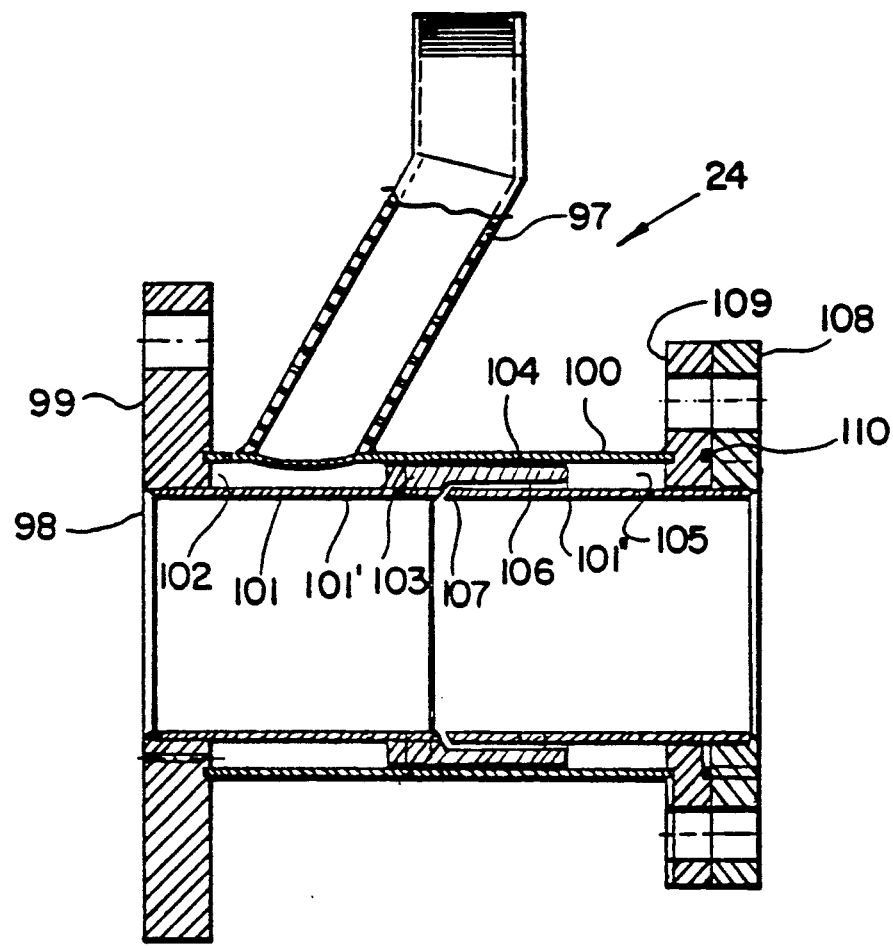
FIG. 8 is a longitudinal vertical sectional view of the steam jet nozzle incorporated in the machine of FIG. 1.

When the machine 10 is operating with the steam jet means in use, the steam is fed to the steam jet nozzles 24 through steam lines 95 in which control valves 96 are located. Each steam line 95 has a jet connecting section 97, which actually is part of the assembly of the steam jet nozzle and is threaded to the remainder of the steam line 95. This jet connecting section 97 is inclined in the direction opposite the direction of flow of the rope R through the nozzle 24. As seen in FIG. 8, the nozzle 24 is formed with a cylindrical housing 98 in line with the horizontal tubular section 22 of which it is a part. At its downstream end, the housing is formed with an annular flange 99 for connection to the adjacent portion of the tubular section 22. The housing is formed with an outer cylindrical wall 100 and an inner cylindrical wall 101 spaced inwardly of the outer wall 100 to form passages and chambers therebetween. At the connection of the jet connecting section 97, the housing is formed with a steam accumulation chamber 102 which receives steam from the jet connecting section 97 and, due to the downstream inclination of the section 97 distributes the steam uniformly throughout the steam accumulation chamber 102 before it leaves the chamber in an upstream direction. An annular intermediate section 103 is formed on the inner wall 101 and projects toward the outer wall 100 to a narrow spacing therefrom and also extends upstream to form a narrow annular supply passage 104 through which steam that is uniformly distributed in the steam accumulation chamber 102 passes in an upstream direction and opens into a wide annular distribution chamber 105. The intermediate section 103, from its upstream end to a spacing from its downstream end is spaced slightly from the inner housing wall 101 to provide an annular steam delivery passage 106 extending in a downstream direction from the distribution chamber 105 to an annular orifice 107 in the inner housing wall 101 opening into the interior of the housing for direction of steam against the traveling rope R within the housing 98. The orifice 107 is inclined in the downstream direction to provide a driving impetus to the rope R.

The size of the orifice 107 is adjustable to adjust the flow and force of the steam jet by the inner housing wall 101 being formed of two aligned components 101' and 101". The downstream component 101' is fixed to the downstream flange 99 of the housing 98 and the outer end of the upstream component 101" is fixed to an outer upstream flange 108. The adjacent upstream end of the outer housing wall 100 is fixed to an inner upstream flange 109. An O-ring seal 110 is mounted in a recess in the flange 109 and projects into contact with the other flange 108 for sealing therebetween. The two flanges 108 and 109 may be spaced at selected spacings by compressing the O-ring, substituting different size O-rings or by inserting spacer disks or shims, which result in adjustment of the spacing of the inner housing wall components 101' and 101", thereby adjusting the size of the orifice 107.

The intermediate section 103 of the housing is secured to the downstream wall component 101' and projects over the upstream wall component 101" from the orifice 107 upstream to a termination of the intermediate section 103 at the distribution chamber 105. This arrangement of the intermediate section 103 forms the supply passage 104 overlapping and outward of the delivery passage 106, both of which terminate at the distribution chamber 105.

In operation, steam entering the housing 98 through the jet connecting section 97 is distributed uniformly in the steam accumulation chamber 102 and then passes upstream through the narrow supply passage 104, which restricts the flow to assure uniformity of distribution from the wide accumulation chamber 102. The steam travels through the supply passage 104 in an upstream direction and discharges into the distribution chamber 105 in a direction opposite to the flow through the delivery passage 106 to the orifice 107, thus further assuring uniform distribution of the steam in the distribution chamber and through the delivery passage 106, which is also narrow to restrict the flow to maintain uniformity and to provide a high flow rate through the delivery passage 106 in the downstream direction and therefrom through the orifice 107, which directs the steam onto the traveling rope R at a downstream inclination.

At the end of an operating cycle, the liquid jet is shut off by manipulating the valve control rod 111, the steam control valve 96 and the various pressure valves, liquid circulation valves and drain valves. The cloth rope R at each treating unit 13 is then withdrawn through the loading and unloading port 112, which also serves as a viewing port, over a guide roller 113 mounted on a bracket 114 projecting exteriorly of the vessel 11, from which the rope R is wound on a reel (not shown) in a conventional manner. A lead rope remains in the machine with its ends tied together so that upon loading with the next rope the ends of the rope to be processed can be sewn to the lead without having to thread the end of the new rope through the machine.

Figure 9:
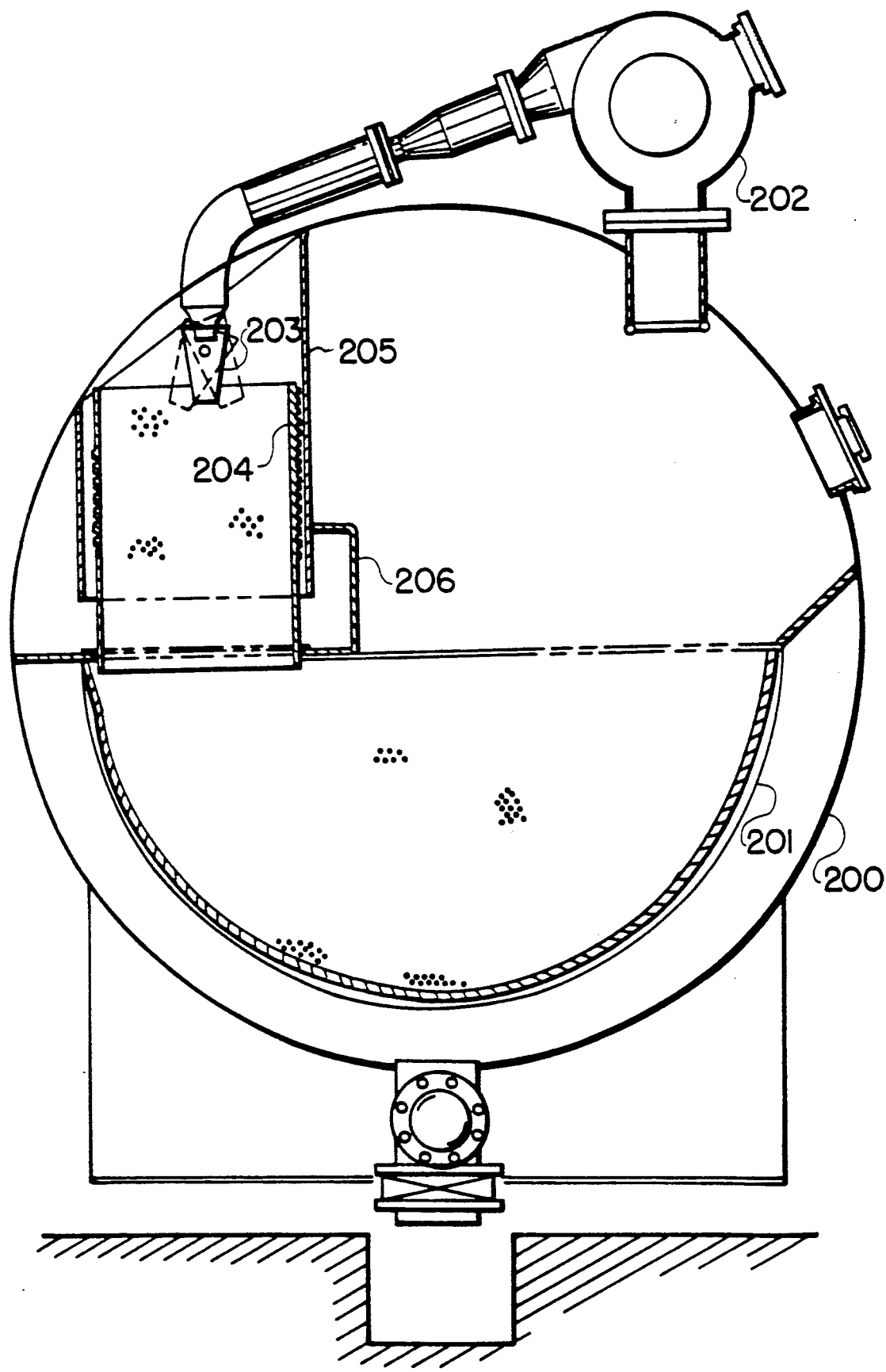
FIG. 9 is a transverse vertical sectional view of a modified form of the machine of the present invention.

A modified form of the low-liquid jet machine of the present invention is illustrated in FIG. 9. In this form, the vessel 200, the U-shaped chamber 201, the circulating means 202 and the plaiting means 203 are the same as the corresponding components of the embodiment of FIGS. 1-8, with the exception that the U-shaped chamber 201 is disposed lower within the vessel 200 and the plaiting means 203 is disposed within the vessel 200 and the associated components of the circulating means 202 are disposed immediately adjacent the top of the vessel 200. In this form, the plug supporting tube 29 extends upwardly from the U-shaped chamber 201 in the same manner as in the embodiment of FIGS. 1-8, but terminates within the vessel 200 rather than extending exteriorly thereof. Similarly, the housing 205 is confined to within the vessel 200. Otherwise, the tube 204, housing 205, and trough 206 are the same as in the preceding embodiment.

Figure 10:
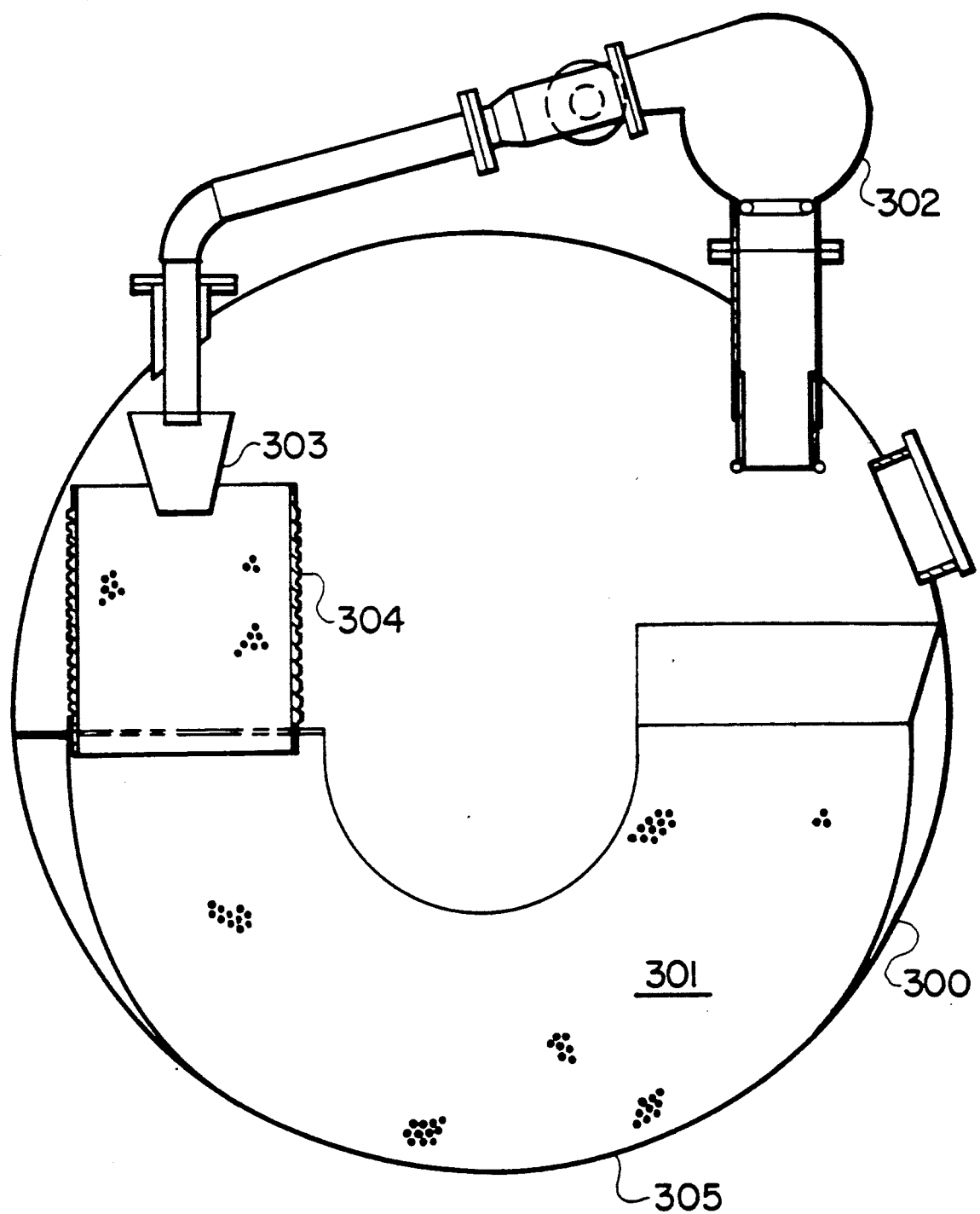
FIG. 10 is a transverse vertical sectional view of a further modified form of the machine of the present invention.

A further modified form of the low-liquid jet machine of the present invention is illustrated in FIG. 10. In this modified form the vessel 300, circulating means 302, plaiting means 303, and plug supporting tube 304 are identical to the corresponding components of the embodiment of FIG. 9, without a housing surrounding the tube or a trough. Further, in this embodiment, the U-shaped chamber 301 extends lower into the vessel 300, with the bottom 305 of the vessel forming the lower portion of the bottom of the chamber 301, thereby eliminating the need for a full separate bottom of the U-shaped chamber 301.

In this embodiment, the level of the recirculating liquid in the chamber 301 would obviously be above the lowermost portion of the bottom of the chamber and, therefore, would be above the lowermost portion of the cloth rope plug progressing through the chamber 301, although with the plug advancing feature of the present invention the liquid may be maintained at a sufficiently low level that it is generally below a level at which the liquid would cause substantial floatation of the plug. This differs from the preferred form of the embodiments of FIGS. 1-9, where the liquid level may be below the bottom of the U-shaped chamber, although a level above the bottom of the chamber in the embodiments of FIGS. 1-9 could also result in a low-liquid operation as sufficient liquid to cause floatation is not necessary in operating a machine according to the present invention.

Figure 11:
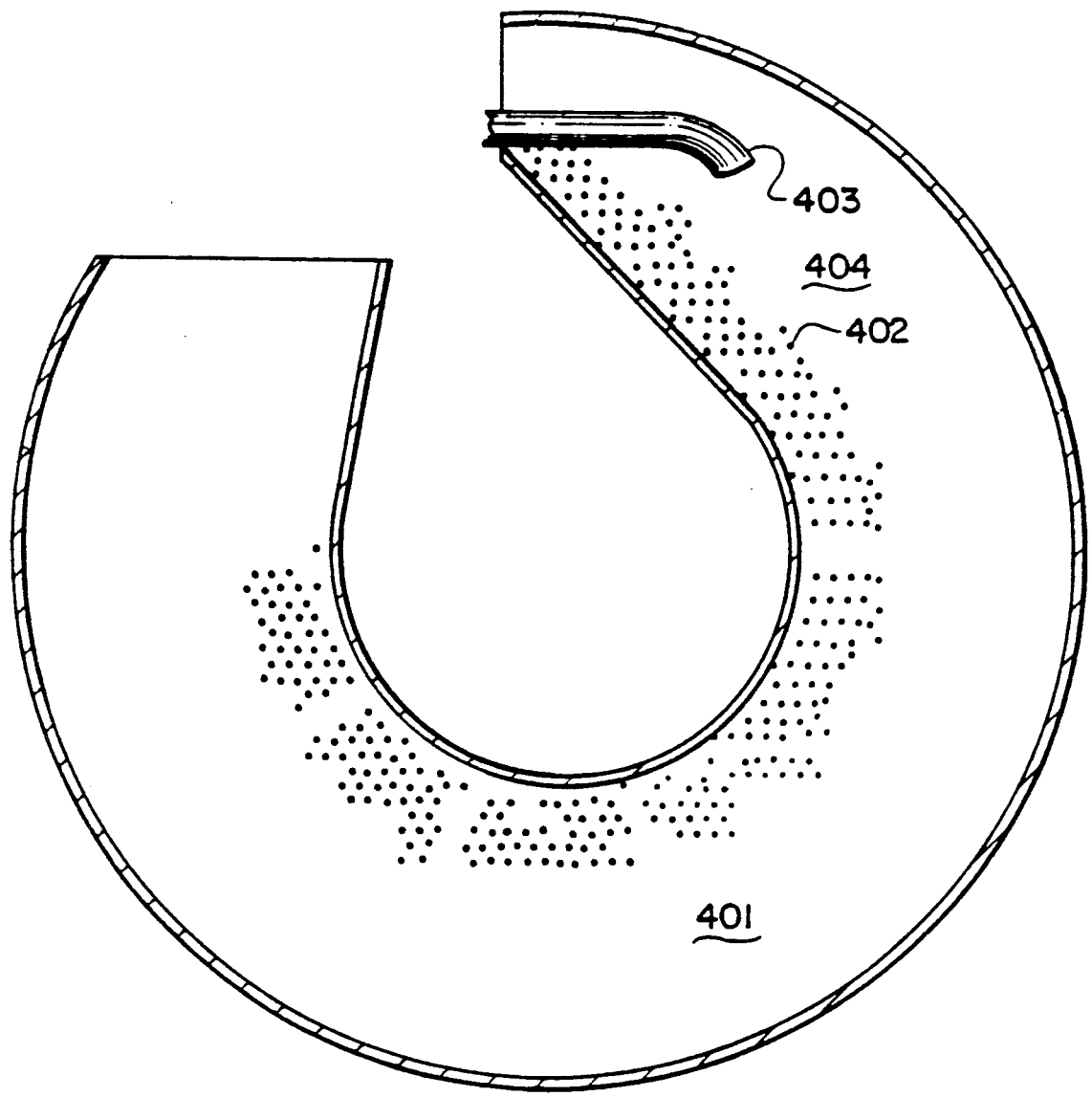
FIG. 11 is a transverse vertical sectional view of a portion of another modified form of the machine of the present invention.

In the embodiments of FIGS. 1-10, the plug supporting tubes 29, 204, 304 are illustrated as generally cylindrical tubes attached to and extending vertically from the U-shaped chambers 15, 201, 301. However, in another modified form illustrated in FIG. 11, the plug supporting tube 404 is, for simplicity and ease of manufacture, simply formed as an integral extension of the U-shaped chamber 401, having similar perforations 402 in the sidewalls thereof to accomplish the same enhanced liquid dispersion therethrough for advantageous plug formation. In this embodiment, the upper extension 404 does not extend truly vertically, but does extend sufficiently generally vertical to provide for the same type of plug formation as the cloth rope exits a stationary nozzle 403 in a generally downwardly extending path.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present* invention. For example, the plug supporting tube may be disposed at an inclination rather than vertically, the arrangement and form of other components may be varied while performing the same general functions described herein. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A low-liquid jet machine for wet processing textile fabric in continuous cloth rope form, comprising:
   a vessel for containing liquid in the bottom thereof;
   a U-shaped chamber within said vessel and disposed for circulation of the cloth rope therethrough in plug form;
   liquid jet means for circulating the cloth rope by withdrawing it from the leading end of the plug at a cloth rope discharge end of the U-shaped chamber and circulating it to the trailing end of the cloth plug at a cloth rope receiving end of the U-shaped chamber;
   means for circulating liquid from the bottom of said vessel to said jet means while maintaining a low level of liquid in the bottom of the vessel generally below a level at which the liquid would cause substantial floatation of the plug;
   said U-shaped chamber having perforated side walls to permit liquid to flow therethrough from the cloth plug to said circulating means and having an imperforate bottom wall for free advance of the cloth plug therealong;
   a plug supporting tube extending generally vertically from and as an extension of the cloth rope receiving end of the U-shaped chamber to a height substantially above the height of the leading end of the cloth plug;
   means for feeding the cloth rope from said fluid jet means into said plug supporting tube to form the cloth rope in plug form in said tube;
   said tube being perforated in the general location of plug formation to permit liquid to flow from the cloth rope to facilitate enhanced uniform plug formation across substantially the full lateral extent of said tube, and said tube extending vertically sufficiently for forming a trailing plug head above the height of the leading end of the plug of sufficient weight to cause the plug to advance through said U-shaped chamber as the cloth rope is withdrawn from the leading end of the plug and fed to the trailing end of the plug.

2. A low-liquid jet machine according to claim and characterized further in that said tube perforations extend around the circumference of said tube throughout a substantial lengthwise extent of said tube for draining of liquid from the cloth plug advancing in said tube.

3. A low-liquid jet machine according to claim and characterized further in that said U-shaped chamber is spaced from the bottom of said vessel to permit flow of liquid therebetween.

4. A low-liquid jet machine according to claim 3 and characterized further in that the bottom of said U-shaped chamber is above the level of liquid in said vessel.

5. A low-liquid jet machine according to claim 1 and characterized further in that the bottom of said vessel forms the bottom of said U-shaped chamber.

6. A low-liquid jet machine according to claim and characterized further by a liquid discharge trough mounted in said vessel and connected to the exterior of said tube adjacent said U-shaped chamber for collecting liquid discharged through said perforations, said trough extending away from said U-shaped chamber and having an outer discharge end for discharging liquid into the bottom of said vessel.

7. A low-liquid jet machine according to claim 6 and characterized further in that said tube has a limited imperforate extent at and extending upwardly from said trough sufficient to prevent liquid in said trough from re-entering said tube.

8. A low-liquid jet machine according to claim 6 and characterized further in that said U-shaped chamber liquid jet means, liquid circulating means, plug supporting tube and cloth feeding means comprise a cloth rope processing unit, said vessel contains a plurality of aligned said units, and said trough extends along all of said units for common discharge of liquid draining from the tubes of all of said units.

9. A low-liquid jet machine according to claim 1 and characterized further by a housing enclosing said tube at a spacing therefrom for confining therebetween the flow of liquid that has flowed through said perforations, said housing having an open lower end for discharge of liquid to the bottom of said vessel.

10. A low-liquid jet machine according to claim 8 and characterized further in that said open end of said housing terminates above the lower extent of said tube, and by a liquid discharge trough mounted in said vessel and connected to said tube below the open end of said housing for collecting liquid flowing from between said housing and tube, said trough extending away from said U-shaped chamber and having an outer discharge end for discharging liquid into the bottom of said vessel.

11. A low-liquid jet machine according to claim 10 and characterized further in that said tube has an imperforate extent at and extending upwardly from said trough into said housing.

12. A low-liquid jet machine according to claim and characterized further in that said vessel is cylindrical about a generally horizontal axis and said plug supporting tube extends exteriorly above said vessel from said U-shaped chamber within said vessel for forming the cloth rope plug at a height above said vessel, and a housing enclosing said tube at a spacing therefrom for confining therebetween the flow of liquid that has flowed through said perforations, said housing having an open lower end within said vessel for discharge of liquid to the bottom of said vessel.

13. A low-liquid jet machine according to claim 12 and characterized further in that said open end of said housing terminates above the lower extent of said tube, and by a liquid discharge trough mounted in said vessel and connected to said tube below the open end of said housing for collecting liquid flowing from between said housing and tube, said trough extending away from said U-shaped chamber and having an outer discharge end for discharging liquid into the bottom of said vessel.

14. A low-liquid jet machine according to claim 13 and characterized further in that said tube has an imperforate extent at and extending upwardly from said trough into said housing.

15. A low-liquid jet machine according to claim 1 and characterized further in that the cloth rope discharge end of said U-shaped chamber flares transversely outwardly at the location of the leading end of the cloth plug to facilitate unentangled withdrawing of the cloth rope from the plug.

16. A low-liquid jet machine according to claim 1 and characterized further by a coating of low friction material on the bottom surface of said chamber to facilitate advance of the plug through said chamber.

17. A low-liquid jet machine according to claim and characterized further in that said perforations are rounded outwardly from the inner surface of said tube to provide a smooth surface for free advance of the cloth plug through said tube.

18. A low-liquid jet machine according to claim 1 and characterized further in that said cloth feeding means comprises a plaiting nozzle at the upper end of said tube and through which the cloth rope and liquid from said jet means are fed into said tube, and means for manipulating said nozzle transversely of said tube for plaiting the cloth rope into plug form.

19. A low-liquid jet machine according to claim 18 and characterized further in that said plaiting nozzle narrows in the direction of cloth and liquid flow to confine the cloth and liquid for enhanced processing interaction.

20. A low-liquid jet machine according to claim 19 and characterized further by a liner removably insertable in said nozzle to reduce the size thereof.

21. A low-liquid jet machine according to claim 18 and characterized further in that said cloth feeding means includes means for reciprocating and oscillation said plaiting nozzle.

22. A low-liquid jet machine according to claim 21 and characterized further in that said means for reciprocating and oscillating said plaiting nozzle includes a shaft extending transversely with respect to said tube and on which said plaiting nozzle is mounted, and means for reciprocating and oscillating said shaft.

23. A low-liquid jet machine according to claim 22 and characterized further in that said means for reciprocating and oscillating said shaft comprises reciprocating drive means, bearing means reciprocated by said reciprocating drive means and connected to said shaft for reciprocation of said shaft, with said shaft being oscillatable with respect to said bearing, and oscillating drive means connected to said shaft for oscillation thereof.

24. A low-liquid jet machine according to claim 22 and characterized further in that said U-shaped chamber, liquid jet means, liquid circulating means, plug supporting tube and cloth feeding means comprise a cloth rope processing unit, said vessel contains a plurality of aligned said units with said shaft extending through all of said units for common mounting thereon of the nozzles at each unit and common reciprocation and oscillation of said nozzles by said means for reciprocating and oscillating said shaft.

25. A low-liquid jet machine according to claim 24 and characterized further in that said means for reciprocating and oscillating said shaft comprises reciprocating drive means, bearing means reciprocated by said reciprocating drive means and connected to said shaft for reciprocation of said shaft, with said shaft being oscillatable with respect to said bearing, and oscillating drive means connected to said shaft for oscillation thereof.

26. A low-liquid jet machine according to claim 1 and characterized further in that said means for circulating liquid includes steam jet means for applying a jet of stream to the traveling cloth rope to facilitate circulation of the cloth rope and low-liquid wet processing thereof, said steam jet means comprising a housing having a hollow cylindrical interior through which the cloth rope travels, and a supply conduit communicating with the housing for supplying steam under pressure thereto, said housing having a relatively narrow annular supply passage for receiving steam from said conduit and extending therefrom in the upstream direction with respect to cloth rope travel, said housing having a relatively wide annular steam distribution chamber at the end of the steam supply passage upstream with respect to cloth rope travel for receiving steam from said supply passage and distributing the steam generally uniformly in the distribution chamber, said housing having an annular steam delivery passage substantially narrower than said distribution chamber and communicating with and extending from the distribution chamber in the downstream direction of cloth rope travel, said steam delivery passage terminating downstream in an annular steam jet orifice opening into the hollow interior of said housing at an inward inclination in the downstream direction of cloth rope travel for discharging steam therethrough to apply a driving force to the traveling rope.

27. A low-liquid jet machine according to claim 26 and characterized further in that said housing has a relatively wide steam accumulation chamber communicating with said conduit and with the end of said supply passage downstream in the direction of cloth rope travel for accumulating steam being applied therethrough from said conduit to the supply passage.

28. A low-liquid jet machine according to claim 26 and characterized further in that the annular supply passage is disposed overlappingly outward of tee delivery passage, and said housing includes an annular intermediate section extending annularly between and separating the supply passage and the delivery passage, said intermediate section terminating at the distribution chamber.

29. A low-liquid jet machine according to claim 28 and characterized further in that said housing has two axially aligned components having inner cylindrical surfaces forming the inner cylindrical surface of said housing, said housing components being spaced apart to form the steam jet orifice, said annular intermediate section being connected to and extending from the component that is downstream in the direction of cloth rope travel and extending over the other of said components to define the steam delivery chamber therebetween.

30. A low-liquid jet machine according to claim 26 and characterized further in that said housing has two axially aligned components having inner cylindrical surfaces forming the inner cylindrical surface of said housing, said housing components being spaced apart to form the steam jet orifice.

31. A low-liquid jet machine according to claim 30 and characterized further in that said housing components are relatively adjustable axially to adjust the size of the steam jet orifice.

32. Gas jet means for applying a jet of gas to a traveling cloth rope to facilitate travel and wet processing of the cloth rope, said means comprising a housing having a hollow interior through which the cloth rope travels, and a supply conduit communicating with the housing for supplying gas under pressure thereto, said housing having a relatively narrow supply passage extending in a loop about the hollow interior for receiving gas from said conduit and extending therefrom in the upstream direction with respect to cloth rope travel, said housing having a relatively wide gas distribution chamber at the extending in a loop about the hollow interior at the end of the gas supply passage upstream with respect to cloth rope travel for receiving gas from said supply passage and distributing the gas generally uniformly in the distribution chamber, said housing having a gas delivery passage substantially narrower than said distribution chamber and extending in a loop about the hollow interior and communicating with and extending from the distribution chamber in the downstream direction of cloth rope travel, said gas delivery passage terminating downstream in a gas jet orifice opening into the hollow interior of said housing at an inward inclination in the downstream direction of cloth rope travel for discharging gas therethrough to apply a driving force to the traveling rope and said housing having a relatively wide gas accumulation chamber communicating with said conduit and with the end of said supply passage downstream in the direction of cloth rope travel for accumulating gas being applied therethrough from said conduit to the supply passage.

33. Gas jet means according to claim 32 and characterized further in that the supply passage is disposed overlappingly outward of the delivery passage, and said housing includes an annular intermediate section extending annularly between and separating the supply passage and the delivery passage, said intermediate section terminating at the distribution chamber.

34. Gas jet means according to claim 33 and characterized further in that said housing has two axially aligned components having inner cylindrical surface forming the inner cylindrical surface of said housing, said housing components being spaced apart to form the gas jet orifice, said annular intermediate section being connected to and extending from the component that is downstream in the direction of cloth rope travel and extending over the other of said components to define the gas delivery chamber therebetween.

35. Gas jet means according to claim 32 and characterized further in that said housing has two axially aligned components having inner cylindrical surfaces forming the inner cylindrical surface of said housing, said housing components being spaced apart to form the gas jet orifice.

36. Gas jet means according to claim 35 and characterized further in that said housing components are relatively adjustable axially to adjust the size of the gas jet orifice.

* * * * *

UNITED STATES PATENT AND TRADEMARK OFFICE
CERTIFICATE OF CORRECTION

PATENT NO. : 5,129,242

DATED : July 14, 1992

INVENTOR(S) : William C. Sturkey et al.

It is certified that error appears in the above-identified patent and that said Letters Patent is hereby corrected as shown below:

Column 2, line 41, delete "cause" and insert therefor -- causing --.

Column 5, line 28, delete "pieces" and insert therefor -- piece --.

Column 8, line 46, delete "fartherest" and insert therefor -- farthest --.

Column 8, line 47, delete "fartherest" and insert therefor -- farthest --.

Column 8, line 53, delete "fartherest" and insert therefor -- farthest --.

Column 8, line 59, delete "fartherest" and insert therefor -- farthest --.

Column 10, lines 16-17, after "chemicals" insert -- , --.

Column 13, line 38, delete "the" and insert therefor -- said --.

Column 13, line 56, after "claim" insert -- 1 --.

Column 13, line 61, after "claim" insert -- 1 --.

Column 14, line 4, after "claim" insert -- 1 --.

Column 14, line 18, after "chamber" insert -- , --.

Column 14, line 45, after "claim" insert -- 1 --.

UNITED STATES PATENT AND TRADEMARK OFFICE
CERTIFICATE OF CORRECTION

PATENT NO. : 5,129,242

DATED : July 14, 1992

INVENTOR(S) : William C. Sturkey et al.

It is certified that error appears in the above-identified patent and that said Letters Patent is hereby corrected as shown below:

Column 15, line 11, after "claim" insert -- 1 --.

Column 15, line 33, delete "oscillation" and insert therefor -- oscillating --.

Column 16, line 2, delete "stream" and insert therefor -- steam --.

Column 16, line 36, delete "tee" and insert therefor -- the --.

Column 17, line 4, delete "at the".

Column 18, line 8, delete "surface" and insert therefor -- surfaces --.

Signed and Sealed this

Sixteenth Day of November, 1993

Attest:

BRUCE LEHMAN

Attesting Officer

Commissioner of Patents and Trademarks